US007349992B2

(12) United States Patent
Moroney et al.

(10) Patent No.: US 7,349,992 B2
(45) Date of Patent: Mar. 25, 2008

(54) SYSTEM FOR COMMUNICATION WITH A STORAGE AREA NETWORK

(75) Inventors: Andrew Moroney, Northborough, MA (US); Gerald Sweeney, Chelmsford, MA (US); Kenneth Baumoel, Waltham, MA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 605 days.

(21) Appl. No.: 10/057,626

(22) Filed: Jan. 24, 2002

(65) Prior Publication Data

US 2003/0145116 A1    Jul. 31, 2003

(51) Int. Cl.
   G06F 15/16    (2006.01)
   H04J 3/16    (2006.01)

(52) U.S. Cl. ............... 709/249; 370/465; 370/466; 370/467

(58) Field of Classification Search .......... 709/249; 370/465–467
   See application file for complete search history.

(56) References Cited

U.S. PATENT DOCUMENTS

| 5,406,644 | A | | 4/1995 | MacGregor | 395/500 |
|---|---|---|---|---|---|
| 5,535,405 | A | * | 7/1996 | Byers et al. | 710/110 |
| 5,572,689 | A | * | 11/1996 | Gallup et al. | 712/200 |
| 5,651,002 | A | * | 7/1997 | Van Seters et al. | 370/392 |
| 5,717,946 | A | * | 2/1998 | Satou et al. | 712/225 |
| 5,809,527 | A | * | 9/1998 | Cooper et al. | 711/133 |
| 5,809,543 | A | * | 9/1998 | Byers et al. | 711/162 |
| 5,991,299 | A | * | 11/1999 | Radogna et al. | 370/392 |
| 6,172,980 | B1 | * | 1/2001 | Flanders et al. | 370/401 |
| 6,356,951 | B1 | * | 3/2002 | Gentry, Jr. | 709/250 |
| 6,400,730 | B1 | * | 6/2002 | Latif et al. | 370/466 |
| 6,401,117 | B1 | * | 6/2002 | Narad et al. | 709/223 |
| 6,453,360 | B1 | * | 9/2002 | Muller et al. | 709/250 |
| 6,606,690 | B2 | * | 8/2003 | Padovano | 711/148 |
| 6,807,581 | B1 | * | 10/2004 | Starr et al. | 709/250 |
| 2003/0084219 | A1 | * | 5/2003 | Yao et al. | 710/300 |

* cited by examiner

*Primary Examiner*—William Vaughn
*Assistant Examiner*—Ranodhi Serrao
(74) *Attorney, Agent, or Firm*—Morrison & Foerster LLP

(57) ABSTRACT

A system enables communication between a first network having a first network protocol and a second network having a second network protocol. At least one of the first and second networks is a storage area network. The system includes first and second data ports for receiving, from the first network, input data and state information respectively. A microsequencer is configured to translate the input data, which is expressed in the first network protocol, into corresponding data expressed in the second network protocol. This translation is performed in part on the basis of the state information.

11 Claims, 8 Drawing Sheets

SYSTEM FOR COMMUNICATION WITH A STORAGE AREA NETWORK

FIELD OF INVENTION

This invention is related to storage area networks, and in particular, to data communication with a storage area network.

BACKGROUND

Data communication between networks frequently involves translation between network protocols. This translation step includes examination of addressing information expressed according to a first network protocol and replacing it with addressing information expressed according to a second network protocol. This operation has typically been carried out by CISC or RISC general purpose microprocessors.

As network bandwidths have increased, data transmission rates have also increased. These increases in data transmission rates have not, however, been matched by corresponding performance increases in microprocessors. For example, within the past decade, data transmission rates have increased by a factor of 10,000, from 64 KBPS to 10 GBPS. However, in that same period, processor clock rates have increased by only a factor of 33, from 33 MHz to 1 GHz.

This growing mismatch between typical data transmission rates and processor clock rates has resulted in delays, and in some cases, data loss associated with passing data between networks characterized by different protocols. This performance mismatch is farther exacerbated in storage area networks because of the processor is then burdened with maintaining considerable state information.

SUMMARY

The invention provides a system for enabling data communication between two networks, at least one of which is a storage area network, carrying protocol data units that may be encapsulated in different protocols. The system includes a microsequencer system to carry out the translation between protocols. An instruction memory having very long instruction words enables the microsequencer system to achieve throughput that is greated than that provided by systems that carry out a single instruction or operation at a time. These very long instruction words enable different functional blocks within the microsequencer system to execute instructions in parallel with each other.

One embodiment of the invention provides a system for enabling communication between a first network having a first network protocol and a second network having a second network protocol. At least one of the first and second networks is a storage area network.

In some embodiments, the microsequencer system includes two or more microsequencers that are connected to one another, either in series, in parallel, or in a combination of both. The microsequencers are configured to cooperate with each other in performing the translation. In other embodiments, the microsequencer system includes only a single microsequencer.

The system includes first and second data ports for receiving, from the first storage area network, input data and state information respectively. As used herein, a port refers to any conduit for either unidirectional and/or bidirectional flow of information. A microsequencer system is configured to translate the input data, which is expressed in the first network protocol, into corresponding data expressed in the second network protocol. This translation is performed on a frame-by-frame basis in part on the basis of the state information. To avoid replacement of the system as protocol standards evolve, the microsequencer system can include one or more programmable microsequencer.

One aspect of the invention includes an instruction memory associated with and accessible to each constituent microsequencer of the microsequencer system. The instruction memory has a plurality of instruction words, each of which is of sufficient length to hold at least two instructions. An instruction-memory pointer identifies a selected instruction word in the instruction memory.

In one embodiment, the first and second networks are both storage area networks. In this embodiment, the second data port, which carries state information, is a bidirectional port. In another embodiment, in which only one of the networks is a storage area network, the second data port can be a unidirectional port. Such an embodiment may be desirable when one network has a state that changes only infrequently. An example of a network that can have a fixed state is an IP network.

To provide multi-point conditional branching capability to the microsequencer system, the system can also include a translation memory associated with and accessible to at least one constituent microsequencer of the microsequencer system. Each translation memory includes a translation-memory address, and a translation-memory element corresponding to the translation-memory address. The translation-memory element includes data for causing the instruction-memory pointer of its associated microsequencer to jump to the selected instruction word. The content of the translation-memory element can include data indicative of an absolute address of the selected instruction word, or alternatively, an offset from a current instruction word to the selected instruction word.

Each constituent microsequencer of the microsequencer system can also include a translation-memory pointer that selects particular translation-memory addresses and thereby indirectly causes the instruction-memory pointer of that microsequencer to jump to a selected instruction-memory address. The translation-memory pointer can, for example, be configured to identify a selected translation-memory address corresponding to a translation-memory element that contains data indicative of the selected instruction-memory address.

In another embodiment, the invention provides a system for enabling communication between a first storage area network having a first network protocol and a second storage area network having a second network protocol. The system includes first and second input ports for receiving, from the first storage area network, data and state information respectively. The state information is associated with the first storage area network, and the data is expressed according to the first network protocol. The first and second input ports are in communication with a processing element. Examples of processing elements include microsequencers, microprocessors, microcontrollers, and application-specific integrated circuits or chains thereof.

An instruction memory accessible to the processing element includes a plurality of instruction words. Each of the instruction words is of sufficient length to hold at least two instructions. The plurality of instruction words is selected to translate input data from the first protocol to the second protocol. An instruction-memory pointer identifies a selected instruction word in the instruction memory.

DETAILED DESCRIPTION

Figure 1:
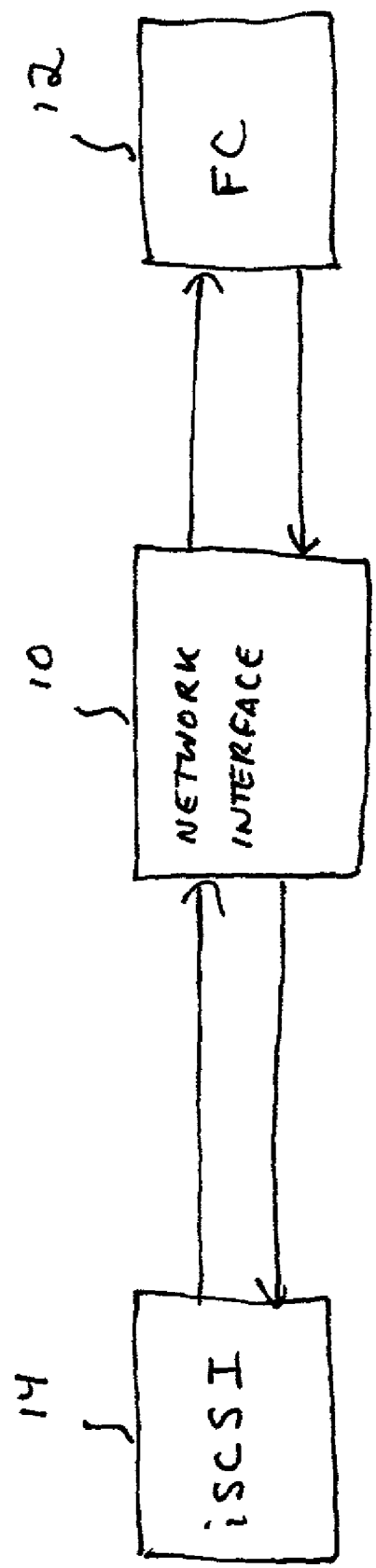
FIG. 1 shows a system for enabling communication between two networks.

FIG. 1 shows a system 10 that provides communication between a fibre channel ("FC") network 12 and an iSCSI network 14. The system 10 translates between iSCSI and fibre channel protocol data units (PDUs). The term "protocol data unit" or "PDU" refers generically to elementary units of data that travel in a network. A PDU includes a "body", which contains the data of interest to the ultimate user, and a "header" which contains information required by the network protocol to ensure delivery of the PDU. While different network protocols use different terms to refer to PDUs, bodies, and headers, and while the details of these entities differ from one network protocol to another, these terms are used herein in their generic sense.

The translation of PDUs from one protocol to another in a storage area network requires maintenance of a significant amount of state information within the system 10. This state information enables PDUs to be mapped to the correct endpoints in the fibre channel network 12 and the iSCSI network 14 and ensures that the semantics of both fibre channel and iSCSI transfers are maintained.

In a TCP network, such as the iSCSI network 14, a connection between two endpoints is uniquely identified by four addresses that make up the TCP/IP connection. These four addresses are: the source and destination IP addresses and the source and destination TCP port numbers. Each TCP/IP PDU carries these four addresses. Since the iSCSI endpoint resides above the TCP connections, it is possible for two iSCSI endpoints to be joined by more than one TCP connection.

In a fibre channel network 12, a connection between two endpoints is uniquely identified by a pair of network address identifiers (referred to herein as "S_ID" and "D_ID") associated with a valid PLOGI/PRLI context. This data is carried by each fibre channel PDU.

In contrast to a TCP/IP PDU, therefore, a fibre channel PDU lacks an addressing mechanism to allow for multiplexing of services or sessions. Thus, the system 10 must construct PDUs for multiple TCP/IP sessions using only the S_ID and D_ID available in a fibre channel PDU. To do so, the system 10 provides a unique network address identifier ("NAI") to be used as its own address in fibre channel PDUs for every iSCSI session it supports. A fibre channel device therefore does not see multiple fibre channel sessions with a particular device. Instead, a fibre channel device sees single fibre channel sessions with multiple fibre channel devices. The system 10 uses the D_ID and the S_ID in an arriving fibre channel PDU to identify the fibre channel connection associated with that PDU.

To enable translation between fibre channel PDUs and TCP/IP PDUs, the system 10 maintains state information. This state information includes information concerning each session, which is stored in a session descriptor, information concerning each I/O transaction, which is stored in an I/O descriptor, state information for each TCP connection, which is stored in one or more connection descriptors associated with each session, and state information for each fibre channel connection, which is stored in a fibre channel descriptor. Examples of such state information include, but are not limited to, a maximum number of command sequences, markers for restoring a connection should the connection falter, and status information indicating the amount of data outstanding.

To process PDUs traveling from the fibre channel network 12 to the iSCSI network 14, the system 10 first performs a table look-up to obtain an association identifier corresponding to the PDU header. This association identifier is then used as an index into an iSCSI session descriptor table, from which the system 10 fetches a corresponding session descriptor block ("SDB"). The SDB is linked to various I/O descriptors ("IOD"). On the basis of information in the current fibre channel PDU, the SDB and the IOD, the system 10 creates an iSCSI PDU. The SDB also identifies the TCP connection (or connections) bound to this iSCSI session and used to transmit the iSCSI PDU. For each such connection, a connection descriptor block ("CDB") stores the TCP parameters used for enqueuing and dequeuing traffic using the TCP window and ACK scheme.

To process PDUs traveling from the iSCSI network to the fibre channel network, the system 10 performs a table look-up to obtain an association identifier corresponding to the four addresses in the header. This association identifier is then used as an index into a connection descriptor table, from which the system 10 fetches a corresponding connection descriptor block. For each connection, the CDB stores various TCP parameters and runs TCP receiver algorithms, including segment reassembly. The CDB also identifies the iSCSI session that the particular connection is bound to. The iSCSI PDUs from various connections (if more than one is present) are re-ordered if necessary. The information in the SDB and IODs is then used to create a fibre channel PDU corresponding to the iSCSI PDU.

Figure 2:
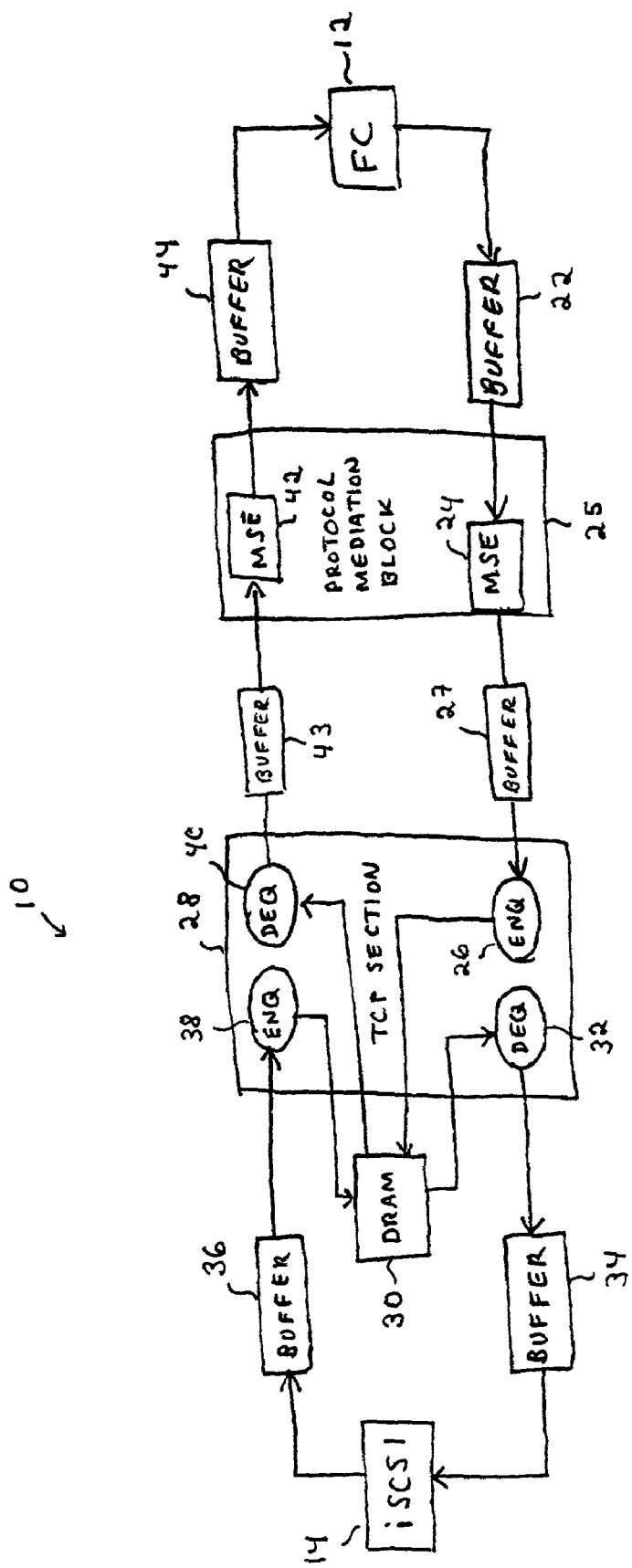
FIG. 2 shows the network interface of FIG. 1 in more detail.

Referring to FIG. 2, a fibre channel PDU originating from the fibre channel network 12 is stored, or buffered, in a first memory element 22, if necessary. Buffering in memory elements is typically necessary when PDUs arrive at the protocol mediation block 25 faster than they can be processed. A first microsequencer system 24 contained in a protocol mediation block 25 then fetches the fibre channel PDU and begins the process of translating the fibre channel PDU into an iSCSI PDU, as described above. The protocol mediation block 25 is such that the processing of a PDU can begin even before the entire PDU has been received. This type of architecture is referred to as "cut-through" architecture. Because the overall architecture is cut-through, it is not necessary for the first microsequencer system 24 to wait for a complete fibre channel PDU to accumulate in the first memory element 22 before beginning to process that PDU.

The first memory element 22 is intended to prevent data loss should any delays in downstream processing cause a back up.

The first microsequencer system 24 generates an iSCSI PDU corresponding to the incoming fibre channel PDU and provides that iSCSI PDU to a first enqueuing process 26 executing in a TCP section 28. A first FIFO buffer 27 between the first enqueuing process 26 and the first microsequencer system 24 provides temporary storage of portions of the iSCSI PDU as necessary. The first FIFO buffer 27 is provided to accommodate small mismatches between the processing rate of the first enqueuing process 26 and that of the first microsequencer system 24.

The first enqueuing process 26 saves iSCSI PDUs in an external DRAM 30, using a linked list of memory blocks. This external DRAM 30 is the only point at which a complete PDU is accumulated. Accumulation of the complete PDU in the external DRAM 30 is necessary to calculate an iSCSI PDU length and TCP segment checksum, both of which are inserted near the beginning of the iSCSI PDU. The first enqueuing process 26 also calculates a TCP checksum over the body portion of the PDU.

A first dequeuing process 32 that monitors the external DRAM 30 also executes in the TCP section 28. Upon recognizing the presence of data in the external DRAM 30, the first dequeuing process 32 reads that data, one TCP-segment at a time, prepends an IP and TCP header thereon, and streams the resulting iSCSI packet to the second memory element 34. The second memory element 34 is intended for cut-through data transmission of larger PDUs. The threshold at which cut-through data transmission is performed is programmable. This cut-through threshold is selected to reduce the likelihood of under-runs in the link between the system 10 and the iSCSI network 14. In the illustrated embodiment, the cut-through threshold is approximately 256 bytes. As a result, PDUs larger than 256 bytes are cut-through, and PDUs smaller than 256 bytes are accumulated.

An iSCSI PDU originating from the iSCSI network 14 is buffered, if necessary, in a third memory element 36. A second enqueuing process 38 executing in the TCP section 28 streams the PDU into the external DRAM 30. Once the entire iSCSI PDU has been saved in the external DRAM 30, the second enqueuing process 38 verifies the PDU's Ethernet CRC and TCP checksum. If the PDU is deemed to be corrupted, the second enqueuing process 38 discards the PDU. Otherwise, it remains in the external DRAM 30 until it comes to the attention of a second dequeuing process 40, also executing in the TCP section 28, that monitors the external DRAM 30.

Upon recognizing the presence of data in the external DRAM 30, the second dequeuing process 40 fetches the data and provides it to a second microsequencer system 42 in the protocol mediation block 25. A second FIFO buffer 43 between the second dequeuing process 40 and the second microsequencer system 42 provides temporary data storage as needed. The second FIFO buffer 43 is provided to accommodate small mismatches between the processing rate of the second dequeuing process 40 and that of the second microsequencer system 42.

The second microsequencer system 42 delineates the iSCSI PDU and creates a corresponding fibre channel PDU. This fibre channel PDU is then buffered in a fourth memory element 44.

The fourth memory element 44, like the second, is intended for cut-through data transmission of larger PDUs. The threshold at which cut-through data transmission is performed is programmable. In the illustrated embodiment, this cut-through threshold is approximately 256 bytes. As a result, PDUs larger than 256 bytes are cut-through, and PDUs smaller than 256 bytes are accumulated.

The first and second micro-sequencer systems 24, 42 include one or more programmable microsequencers collectively configured to translate one protocol into another. Neither microsequencer system 24, 42 performs any routing or switching functions. Both however, can be programmed to execute other translations such as FCIP (fibre channel over IP) to or from FCP. Some translations may require, or be better performed, with the assistance of additional hardware elements, such as system timers, data-stream escapers, or frame parsers.

Figure 3:
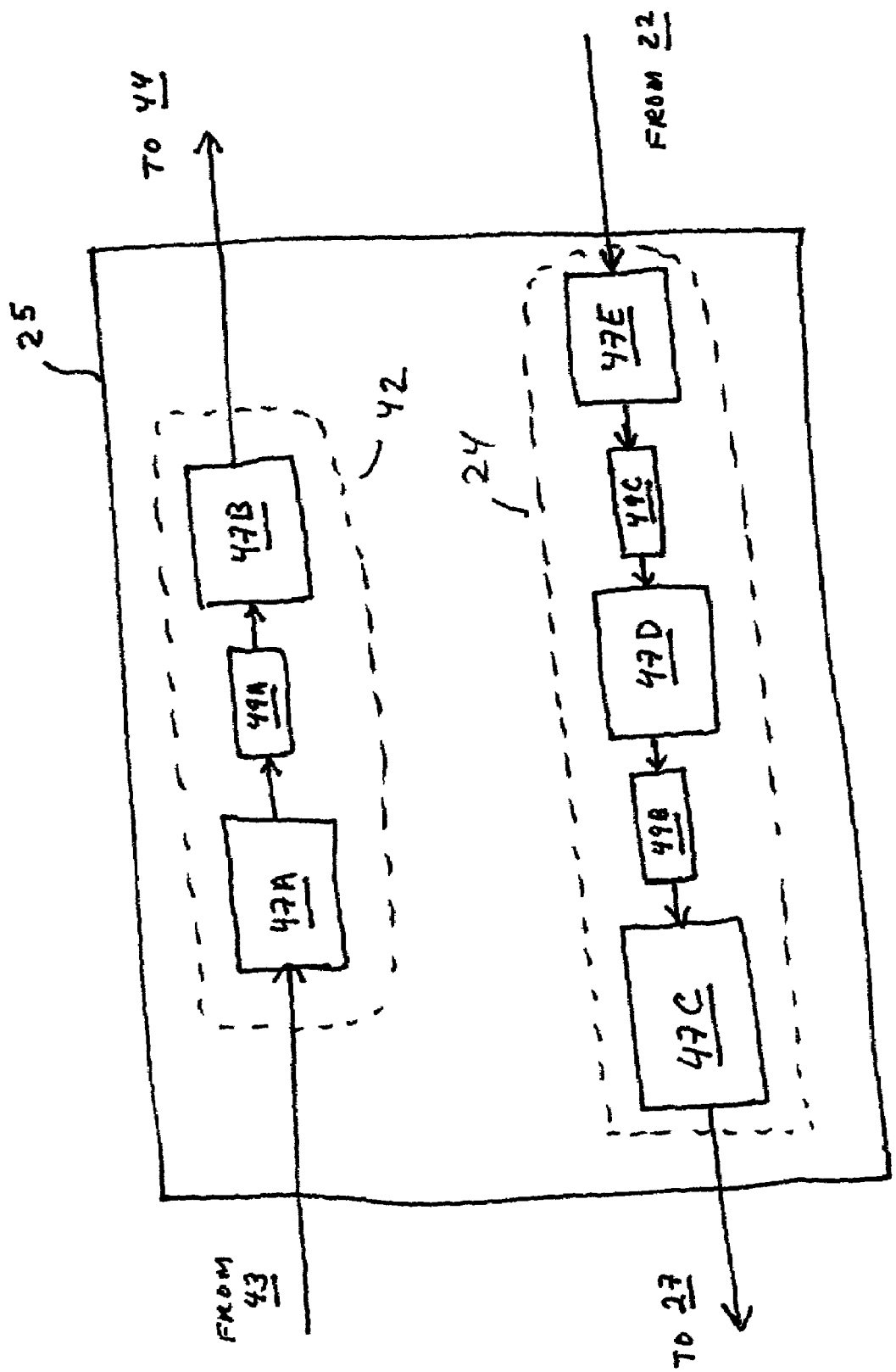
FIG. 3 shows two microsequencer systems having chained microsequencers.

FIG. 3 exposes the architecture of the first and second microsequencer systems 23, 42 within a protocol mediation block 25. The second microsequencer system 42 includes first and second microsequencers 47A-B serially connected. A third FIFO buffer 49A disposed between the first and second microsequencers 47A-B provides elasticity for accommodating mismatches between the processing rates of the first and second microsequencers 47A-B.

Similarly, the first microsequencer system 24 includes third, fourth, and fifth microsequencers 47C-E serially connected. A fourth FIFO buffer 49B disposed between the third and fourth microsequencers 47C-D provides elasticity for accommodating mismatches between the processing rates of the third and fourth microsequencers 47C-D. A fifth FIFO buffer 49C disposed between the fourth and fifth microsequencers 47D-E provides elasticity for accommodating mismatches between the processing rates of the fourth and fifth microsequencers 47D-E.

The constituent microsequencers of either the first or second microsequencer systems 24, 42 can be chained serially, as shown in FIG. 3, in parallel, or in any combination thereof. With multiple microsequencers available, each microsequencer need execute only a small number of threads (no more than a dozen) simultaneously. This simplifies the tasks of logic design and microsequencer programming and thus leads to a shorter design cycle.

The constituent microsequencers 47A-E of the first and second microsequencer systems 24, 42 are identical. Hence, the discussion that follows describes the first microsequencer 47A in detail, with the understanding that the remaining microsequencers 47B-E are structurally and operationally identical.

The first microsequencer 47A (hereinafter referred to as "the microsequencer") is designed to work with PDUs of various sizes. However, optimal performance is achieved when the PDUs are no larger than 2.5 KB. The microsequencer 47A has a clock rate of 125 MHz, with one instruction cycle occurring with every clock cycle. In each instruction cycle, however, the microsequencer 47A is capable of executing more than one instruction. This is achieved by providing a very long instruction word (VLIW) that contains fields to be executed by different functional units of the microsequencer 47A. By executing more than one instruction with each clock cycle, the microsequencer 47A achieves higher throughput (8 bytes every four clock-cycles) while maintaining a modest clock rate. As a result, the microsequencer 47A avoids many of the difficulties associated with increasing the clock rate. Such difficulties include excessive power consumption, RF interference, dispersion of high frequency components, and excessive heat generation resulting from switching losses.

The microsequencer 47A maintains state information by communicating with the session database, the connection database, the fibre channel database, and the I/O database. Such communication includes updating database values, requesting and releasing database entries, and maintaining processing context. The maintenance of state information often requires conditional branching on the basis of incoming data. The microsequencer 47A implements such conditional branching using a hardware case statement to be described in more detail below.

Figure 4:
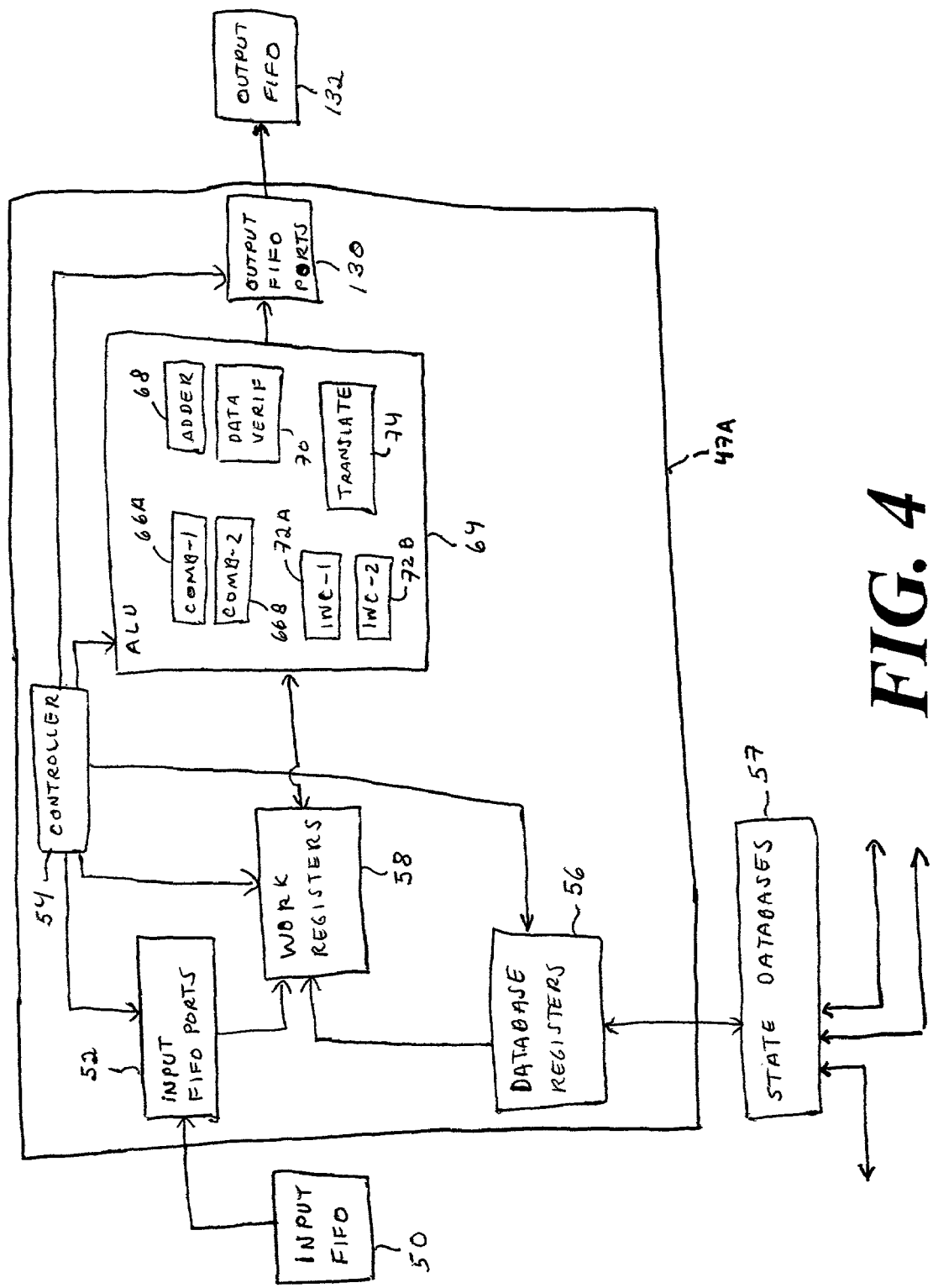
FIG. 4 shows a microsequencer from the microsequencer system in FIG. 3.

FIG. 4 shows an input FIFO memory 50 in communication with the microsequencer 47A. The illustrated input FIFO memory 50 corresponds to the second FIFO buffer 43 shown in FIG. 2. However, the structure and function of the second FIFO buffer 43 is the same as that of the third, fourth, and fifth FIFO buffers 49A-C shown in FIG. 3. Hence, the following description also applies to those FIFO buffers.

The input FIFO memory 50 provides a temporary repository for incoming data as it waits to be unloaded by the microsequencer 47A. The input FIFO memory 50 is a synchronous word-based FIFO running at 125 MHz that can be externally programmed to accept either 32-bit or 64-bit data, depending on whether the incoming PDU is an iSCSI packet or a Fiber Channel frame.

Logically, the input FIFO memory 50 is a 32-bit wide structure. An end-bit accompanying each 32-bit entry implicitly marks the start of a new PDU. It is not, however, a requirement that an end-bit accompany the end of a PDU, only that if an end-bit does occur, the PDU must end. This enables the microsequencer 47A to adjust to the presence of start-of-packet markers in the TCP data stream.

Data from the input FIFO memory 50 is provided to the microsequencer 47A through a pair of 32-bit input FIFO ports 52 on which are carried whatever data occupies the top of the input FIFO memory 50. Each input FIFO port 52 includes a flag bit to indicate whether the data available at that port is valid. The activity of these input FIFO ports 52 is controlled by the microsequencer's instruction controller 54.

The input FIFO memory 50 can be advanced in increments of 8, 16, 32 or 64-bits. To facilitate stream manipulations, the input FIFO memory 50 can jump up to sixty-four words either up or down its memory locations. This rewind and fast-advance ability of the input FIFO memory 50 permits recall of a packet later discovered to be an exception case (i.e. a packet that requires local processor intervention).

A program executed by the microsequencer 47A will generally not start unless valid data is present in the input FIFO memory 50. To enforce this, such programs include a read from the input FIFO memory 50.

The protocol mediation block 25 also includes database registers 56 intended for holding state information. The database registers 56 are two-way ports to corresponding database constructs maintained in a state database 57. In response to instructions from the instruction controller 54, state information passes through the database registers 56.

The state database 57 is a memory element that is shared between the microsequencer 47A, the host, and any other microsequencers included in the microsequencer system. Hence, the state database includes a locking mechanism to avoid race conditions and to ensure that no two microsequencers write to the same memory location at the same time.

Where the system 10 is configured to enable communication between two storage area networks, state information can flow to the microsequencer 47A from the state databases 57 through the database registers 56 and vice versa. In other cases, in which the system 10 is configured to enable communication between a storage area network and a conventional network, this bidirectional flow of information may be unnecessary.

In the illustrated embodiment, fifteen 32-bit session database registers 56 are allocated evenly among the available database constructs. However, since each of the thirty registers will have its own load line, logic external to the microsequencer 47A can alter this default allocation. This external logic can also connect to these database registers 56. Examples of external logic blocks include the external input FIFO, which provides queue depth or status, a system clock or timer, logic for setting and clearing semaphores, and logic for sending interrupts.

The microsequencer 47A next evaluates the start of the input protocol data stream and the session status, and either requests an existing I/O database entry or requests a new one. The instruction controller 54 causes corresponding values of the I/O database to be loaded into the database registers 56 allocated to that database. Typically, data from the database registers 56 and the input FIFO memory 50 is loaded into work registers 58.

The work registers 58 are sixteen general-purpose 32-bit registers organized into eight pairs. At any time, only one work register 58 from each pair can be written to. However, any of the sixteen work registers 58 are available to be read from at any time. Note that if a work register is loaded during a particular instruction cycle, the desired value will be available for use in the next instruction cycle.

In the illustrated embodiment, eight of the work registers 58 are used to implement four built-in comparators, each of which includes two registers, a set of four flags, and a setup register. The states of the four flags depend on a relationship between the contents of the two registers. The nature of this relationship, and hence the meaning of the flags is controlled by the associated setup register.

An initial value placed in the associated setup register configures the comparator to perform natural arithmetic, in which case the values in the first and second registers are considered to be unsigned integers. The first flag is set whenever the values in the first and second registers are equal, the second flag is set whenever the value in the first register is greater than the value in the second register, and the third flag is set whenever the value in the first register is less than the value in the second register. The fourth flag is set if the AND mask of the first and second registers is non-zero.

Additional values placed in the associated setup register configure the comparator to perform 8, 16, or 32-bit serial arithmetic. In such cases, the first three flags have meanings analogous to those described above, and the fourth flag is set whenever the values in the first and second registers have an undefined relationship. In the case of 8 and 16-bit serial arithmetic, only the lower eight or sixteen bits of each register are used in determining which of the flags to set.

Comparison and flag-setting as defined above require two clock cycles to complete. This results in a pipeline delay because if the registers are loaded at a particular instruction cycle, the flags will not be ready for use until two clock cycles later, namely the second instruction cycle following the particular instruction cycle. The comparisons are executed automatically every instruction cycle. Any branch jump or conditional instruction may reference these flags as long as this pipeline delay is respected.

The instruction controller 54 then causes the data in the work registers 58 to be loaded into an ALU 64 for protocol conversion. The ALU 64 includes several blocks to be described in more detail below. Each constituent block of the ALU 64 includes one or two input registers, function logic, and an output register. The input registers hold data indefinitely once loaded. However, with two exceptions, a function associated with that block cannot be invoked until the instruction cycle following the cycle that loads the input registers. The output register of each block is loaded automatically by invoking the function associated with that block. In addition, the output register will not be available for use until the instruction cycle following invocation of the function. Note that some functions will require more than one cycle to execute.

Within the ALU 64 are two independent combinatorial blocks 66A-B, each of which provides various logical operations. These logical operations include binary OR, AND, and XOR, and unary operand barrel shifts of 1, 2, 4, 8, or 16-bits in either direction. In addition, each combinatorial block 66A-B provides for application of a 32-bit AND mask and a barrel shift within the same instruction cycle.

Each of the above logical operations is represented by a 4-bit op-code. Each combinatorial block 66A-B has a primary input register for use with unary operations, and a secondary input register used in conjunction with the primary input register for binary operations. Each combinatorial block 66A-B also has an output register that is loaded any time the op-code is non-zero.

To ease the design and synthesis of the combinatorial blocks 66A-B, the barrel shift operations are limited to shifts that are powers of two. In addition, the value stored in the output register of the combinatorial block 66A-B can be loaded into either one of the input registers of the combinatorial block 66A-B without an extra loading cycle. This property, referred to as "fast looping", is also available in certain other blocks of the ALU 64.

The ALU 64 further includes an adder block 68 having a primary input register, which is also capable of fast looping, a secondary input register, and an output register. The adder block 68 implements a 32-bit adder that executes an addition in two clock cycles and a two's-complement subtraction in one clock cycle.

The ALU 64 also includes a data verification block 70 for verifying data integrity of an input word. The data verification block 70 provides three functions for data verification: a 32/16 bit checksum, a standard CRC-32, and an iSCSI CRC. All three functions are serviced by two 32-bit input registers. A 4-bit setup register controls which of the three functions is to be activated. With four bits in the setup register, it is possible to invoke any combination of the three data verification functions on the same input word.

Configuring the data-verification block 70 to execute the 32/16-bit checksum divides the output register of the data verification block 70 into two 16-bit lanes. Each lane can: hold a 16-bit checksum; hold the appropriate half-word lane of the 32-bit checksum; hold the running sum of the 16-bit checksum (as defined for a Fletcher or Adler checksum); or be hard-wired to 0000h. The checksum addition can be two's complement, one's complement, mod 65521 (Adler Addition), or the logical inverse of any of the foregoing. An external setup register associated with the data verification block 70 controls what each lane is to hold.

When configured to execute a standard CRC-32 (also referred to as "CRC fixed"), the data verification block 70 evaluates the CRC using the polynomial:

$$X^{32}+X^{26}+X^{23}+X^{22}+X^{16}+X^{12}+X^{11}+X^{10}+X^{8}+X^{7}+X^{5}+X^{4}+X^{2}+X+1$$

An external setup register controls initial startup state and any final inversion of the CRC residue or remainder bits.

When configured to execute an iSCSI CRC (also referred to as "CRC masked"), the data verification block 70 evaluates the CRC using the polynomial:

$$X^{32}+X^{28}+X^{27}+X^{26}+X^{25}+X^{23}+X^{22}+X^{20}+X^{19}+X^{18}+X^{14}+X^{13}+X^{11}+X^{10}+X^{9}+X^{8}+X^{6}+1.$$

The ALU 64 also includes two incrementer blocks 72A-B, each of which can increment or decrement a value by 0, 1, 4, or 8 counts. Each incrementer block 72A-B includes a single input register and a single output register. The input register contains a fast loop that allows the output register to be loaded into the input register in the same instruction cycle. This eliminates wasting an instruction cycle to load the output value back to the input register).

Figure 5:
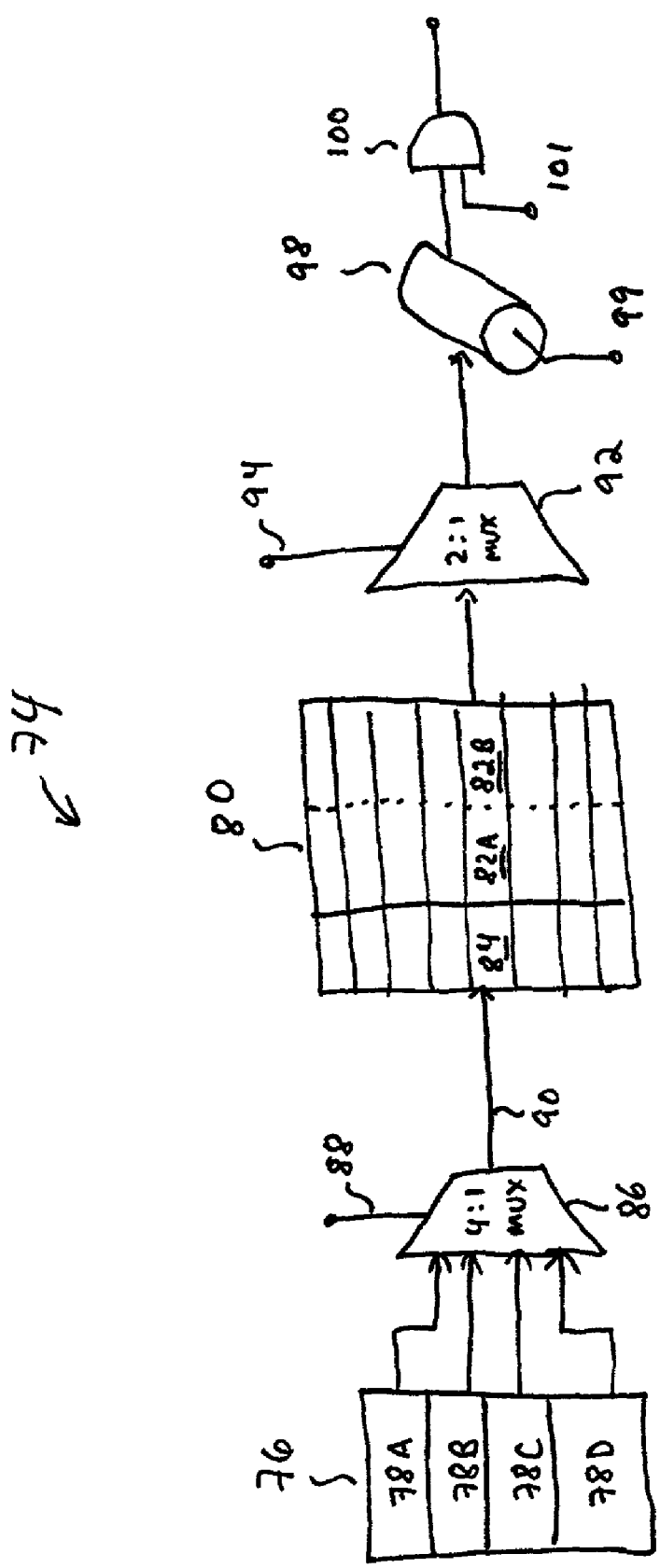
FIG. 5 is a translator block of a microsequencer in FIG. 4.

The ALU 64 further includes a translator block 74, shown in more detail in FIG. 5. The translator block 74 includes a 32-bit input register 76 that contains four 8-bit indices 78A-D and a translation memory 80. The translation memory 80 is typically a 256 entry 64-bit SRAM having a self-checking mechanism such as a parity check. A first translation-memory value 82A occupies the thirty-two higher order bits and a second translation-memory value 82B occupies the thirty-two lower order bits. A translation-memory address 84, which can be addressed by any one of the four 8-bit indices 78A-D, identifies the pair of translation-memory values 82A-B.

A first multiplexer 86 interposed between the translation memory 80 and the input register accepts a first control input 88 for selecting one of the four indices 78A-D provided by the input register 76 and an output that provides a selected index 90 to the translation memory 80. In response to receiving the selected index 90, the translation memory 80 provides the pair of translation-memory values 82A-B that correspond to the translation-memory address 84 identified by the selected index 90.

A second multiplexer 92 receives the pair of translation-memory values 82A-B from the translation memory 80, and on the basis of a second control input 94, selects either the higher or lower order bits stored in the translation-memory address 84 identified by the selected index 90. The output of the second multiplexer 92, which is a 32-bit value corresponding to a selected one 82A of the pair of translation-memory values 82A-B, is passed to a barrel shifter 98. The barrel shifter 98, under the control of a third control input 99, shifts the selected translation-memory value to a desired byte lane of a 64-bit word. The output of the barrel shifter 98 is then provided to a byte mask 100. A fourth control input 101 causes the byte mask to hide those byte lanes that do not contain desired data.

Figure 6:
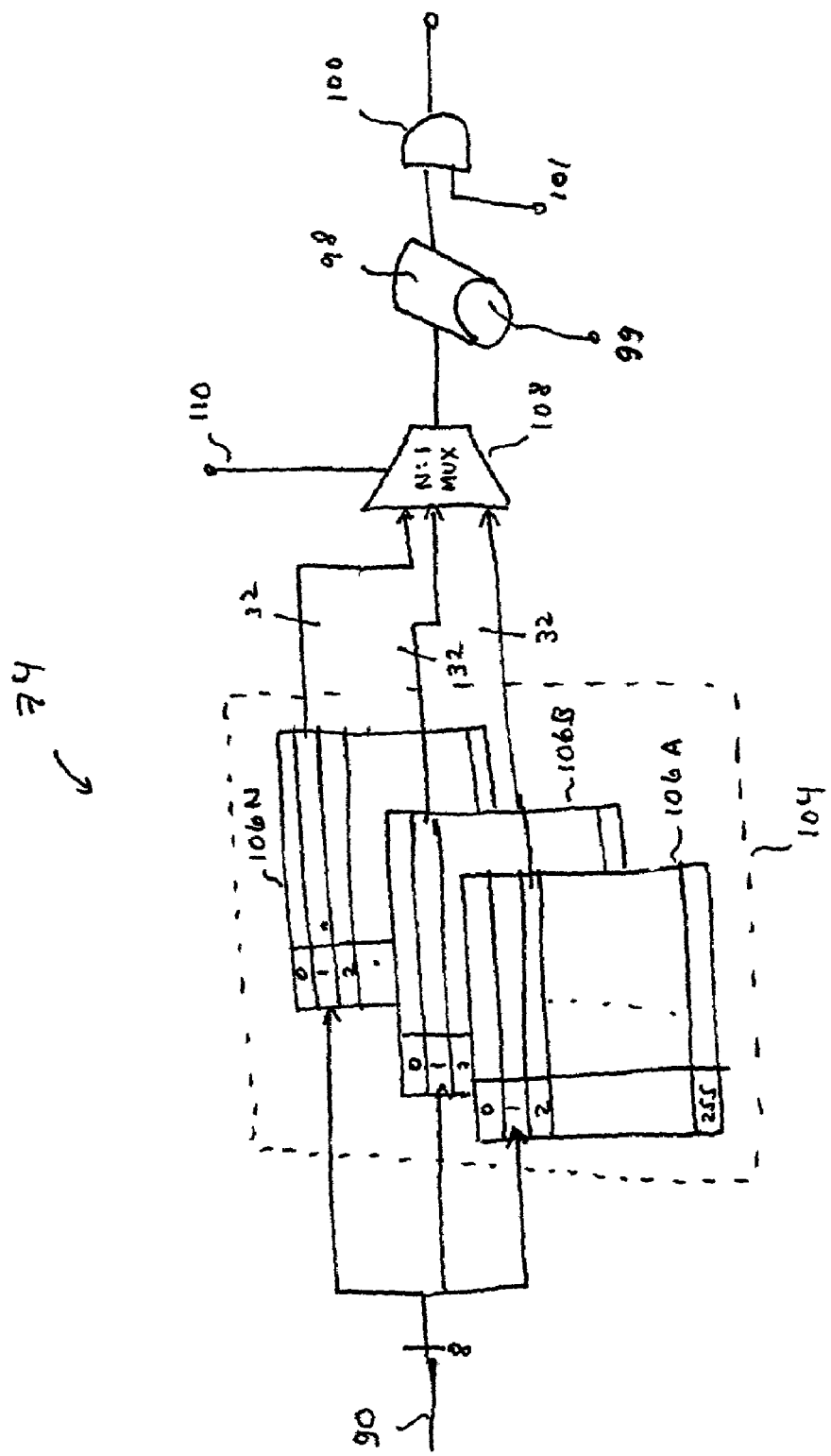
FIG. 6 is an alternative translator block of either microsequencer in FIG. 4.

As shown in FIG. 5, the selected index 90 selects two translation-memory values 82A-B from the translation memory 80. However, as shown in FIG. 6, the translator block 74 can also be configured such that the selected index 90 selects more than two translation-memory values. Alternatively, the translator block 74 can be configured to select only one translation-memory value 82A, in which case no second multiplexer 92 is needed.

FIG. 6 is a logical representation of a translation block 74 in which the selected index 90 selects N 32-bit values from a translation memory 104 logically divided into N memory banks 106A-N. Each memory bank 106A holds 256 32-bit values. In the embodiment shown in FIG. 6, each of the N selected 32-bit values is provided to an N:1 multiplexer 108. In response to a value presented at its control input, the N:1 multiplexer 108 selects one of the 32-bit values and passes it to a shifter 98 and mask 100 as described in connection with FIG. 5.

There are two clocked logic points in the translator block 74: one at the translation memory and another at the output register. As a result, translation requires at least two clock cycles. To limit pipeline delays, the translator block 74 is configured so that the translation operation begins in the same clock cycle in which the input register is loaded.

The translator block 74 is intended to handle certain odd protocol value equivalents (such as translating SCSI attribute values to iSCSI attribute values, translating SCSI task management flags to iSCSI task management functions, and translating SCSI bi-directional overflow/underflow flags to SCSI bi-directional overflow/underflow flags), and to handle jumps in which one of multiple jump points must be selected based on a byte value. Among the jumps to be handled by the translator block 74 include those that are functionally equivalent to "case" statements available in many higher-level programming languages. The translator block 74 thus provides a mechanism for implementing a hardware "case" statement.

In a conventional "case" statement, a comparison variable is compared to a series of comparison constants. If the comparison variable is equal to a comparison constant, control jumps to a specified sequence of instructions. Each comparison between a comparison variable and a comparison constant typically consumes one clock-cycle. As a result, a software implemented case statement can require considerable processing time for execution, particularly as the number of comparison constants grows larger.

A case statement requires three elements: a comparison variable, comparison constants to be compared with the comparison variable, and a pointer to one or more instructions to be executed in the event that the comparison variable and a comparison constant are equal. Within the context of the translator block 74, the comparison variable is the input to the translator block 74, the comparison constants correspond to the translation-memory addresses 84, and the pointers correspond to the translation-memory values 82 associated with each of the translation-memory addresses 84.

Figure 7:
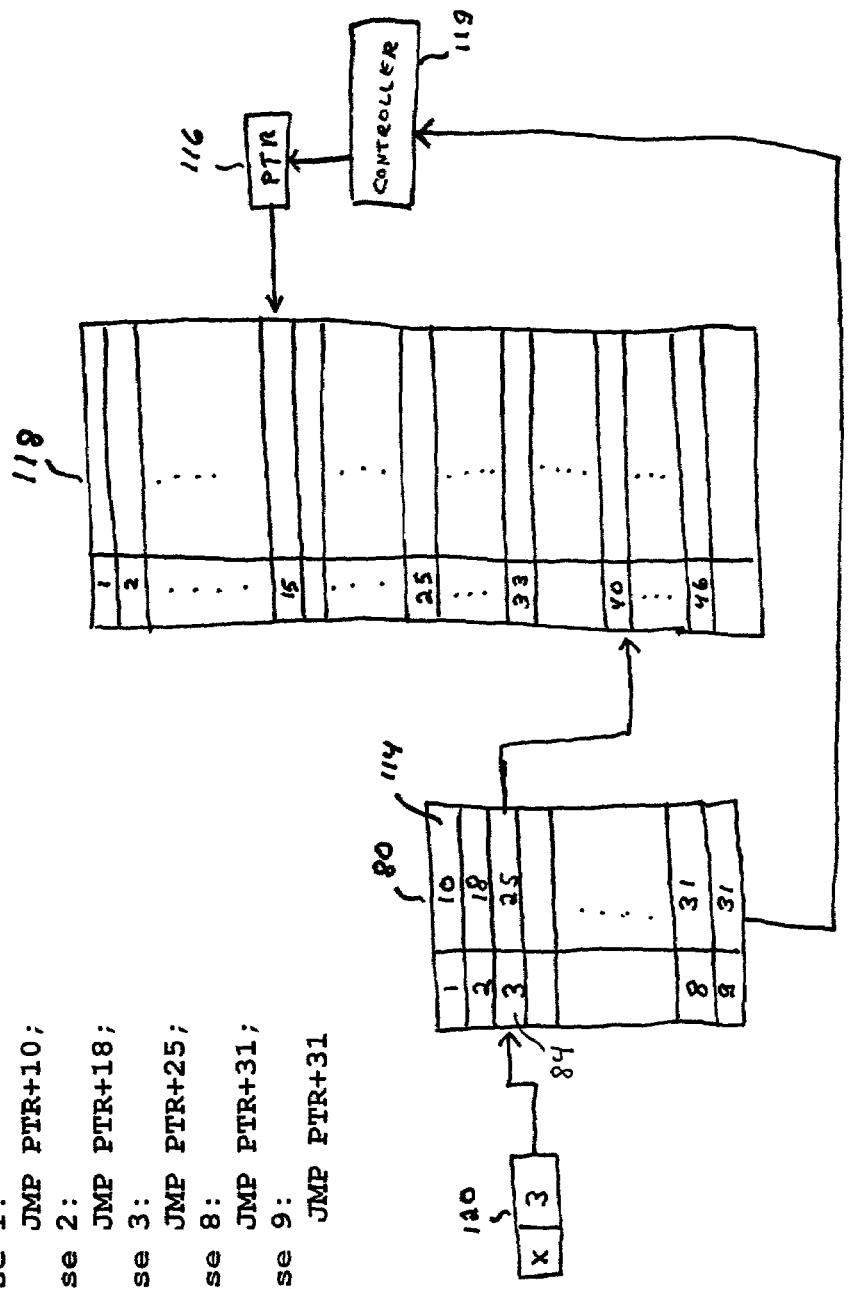
FIG. 7 shows an implementation of a hardware case statement.

FIG. 7 illustrates the manner in which the translator block 74 executes an exemplary case statement 112. Each of the comparison constants 1, 2, 3, 8, and 9 in the exemplary case statement 112 corresponds to a translation-memory address 84 in the translation memory 80. A translation-memory value 114 stored at a particular translation-memory address 84 represents an offset from a current location of an instruction-memory pointer 116 to an instruction memory 118. In FIG. 7, the instruction-memory pointer 116, under the control of the instruction controller 54, points to location "15" in the instruction memory 118.

As an example, a comparison value of "3", when loaded into an input register 120 of the translation block 74 indexes the translation-memory value, in this case "25", stored at translation-memory address "3". The value of "25," which is the output of the translation block 74, is provided to the instruction controller 54.

The instruction controller 54, shown in FIG. 7, governs the operation of the microsequencer 47A. The instruction controller causes the microsequencer 47A to idle at a known address until the arrival of a PDU and its corresponding session descriptor. The instruction controller then advances the instruction-memory pointer 116 one address position at a time until it encounters either a jump or a reset.

In response to receiving the output of the translator block 74, the instruction controller 54 causes the instruction-memory pointer 116 to jump over twenty-five memory locations in the instruction memory 118. As a result, the next instructions to be executed will be those at location "40" in the instruction memory 118.

The jump instruction specifies the next instruction-memory address. A jump can be an immediate jump or a branch jump. An immediate jump takes effect immediately. Consequently, for immediate jumps, the next clock cycle loads the instruction from the instruction-memory address specified in the jump command. Branch jumps because they rely on results provided by the various blocks of the ALU 64, do not take effect immediately. Instead, they accommodate pipeline delays by taking effect after one or more instruction cycles. This ensures that results provided by other blocks of the ALU 64 are valid.

In the example shown in FIG. 7, the translation-memory values 114 represent offsets to be added to the current value of the instruction-memory pointer 116. However, the translation-memory values 114 can also represent absolute addresses for replacing the current address of the instruction-memory pointer 116.

Although the hardware case statement is described herein in the context of a micro-sequencer 47A, identical or equivalent logic can be used by other types of processing elements to implement a hardware case statement. Such processing elements include microprocessors, microcontrollers, and variants thereof.

In the illustrated embodiment, the instruction memory 118 is a parity-protected 256-bit internal memory having 4096 entries. The instruction memory 118 is typically a single-port RAM that is loaded at system start-up and not modified during normal operation of the microsequencer 47A. A 256-bit local processor interface (not shown) is provided for loading and maintaining the instruction memory 118. This enables the microsequencer 47A to be programmable. The programmability of the microsequencer 47A enables the system 10 to accommodate evolving network protocol standards.

The 256 bits in each instruction-memory location provide space for storing instructions to be executed by several independent blocks in the microsequencer 47A. This feature enables the microsequencer 47A to execute several instructions in one instruction cycle, thereby increasing overall throughput without increasing clock rate.

Figure 8:
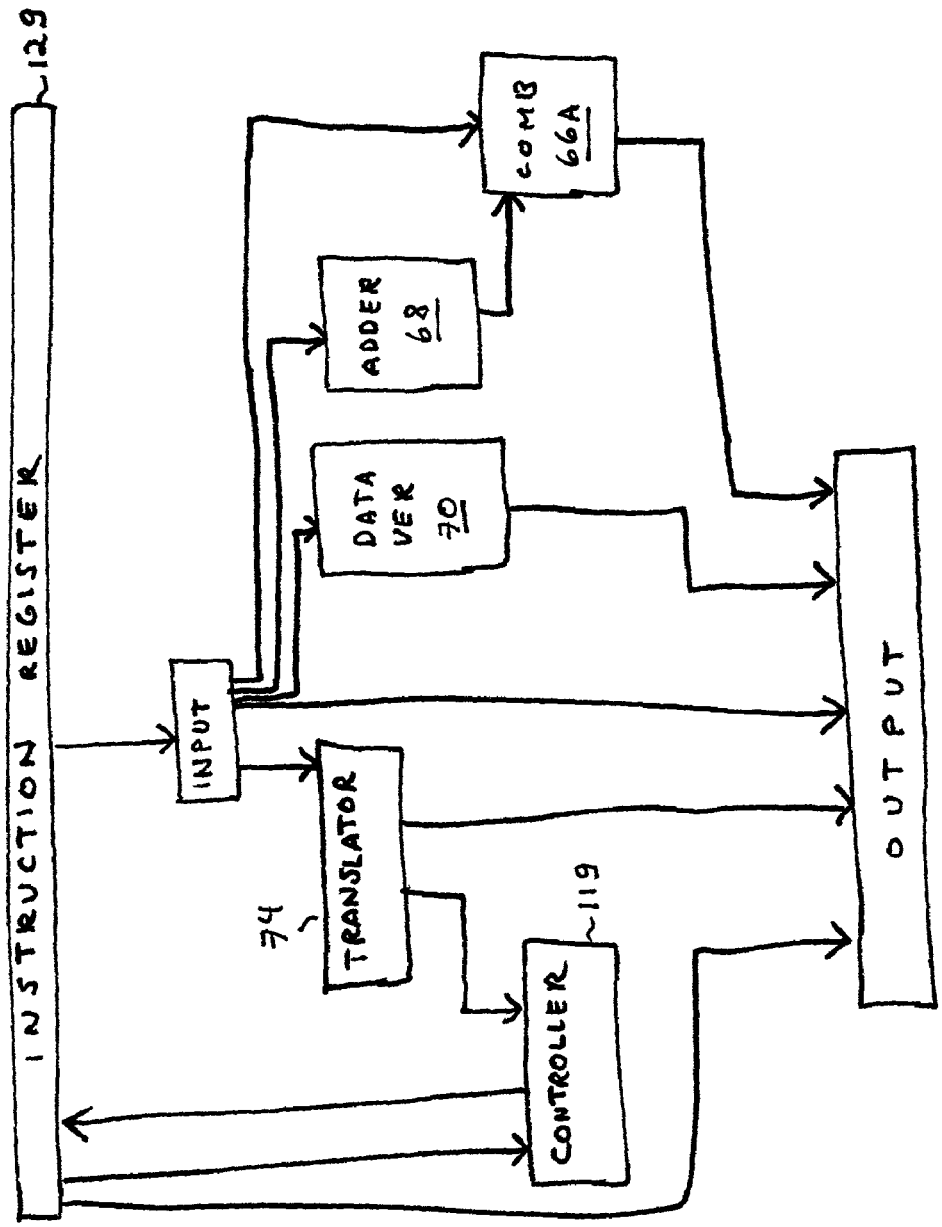
FIG. 8 illustrates parallel execution of instructions within the microsequencer of FIG. 3.

As shown in FIG. 8, different portions of an instruction register 129 typically include instructions to be carried out by different blocks of the ALU 64. For example, in FIG. 8, the translate block 74, the data-verification block 20, and the adder 68 are shown reading different portions of the instruction register 129 during a single instruction cycle. This feature enables several instructions to be executed in one instruction cycle, thereby increasing overall throughput without increasing clock rate. The resulting throughput enables the system 10 to process PDUs at, or near line rate.

Of particular interest in FIG. 8 is that the instruction controller 54 also reads a portion of the instruction register 129 and accepts input from the translate block 74. An example of such input is the offset stored in the translation memory 80 as shown in FIG. 7. This enables the instruction memory pointer 116 skip over selected instructions in the instruction memory 118.

The results of processing by the ALU 64 are forwarded back to the work registers 28. At the start of a converted packet, the instruction controller 54 causes processed data to be passed from the work registers 28 to output FIFO ports 130, where they are made available to an output FIFO memory 132. The illustrated output FIFO memory 132, which is structurally identical to the input FIFO memory 50, corresponds to the third FIFO buffer 49A shown in FIG. 3. However, the illustrated output FIFO memory 132 is also structurally identical to the fourth and fifth FIFO buffers 49B-C, shown in FIG. 3, and to the first FIFO buffer 27, shown in FIG. 2.

The output FIFO memory 132 holds the header of a PDU separately from the body. This is because in many cases, the header of a PDU will contain data that is not known until a significant portion of the PDU has already been processed. Therefore, to provide optimal performance, it is preferable to forward the body of a PDU to downstream logic while retaining the header of the PDU for further processing. The completed PDU is ultimately placed in an output FIFO memory 132, where it is held until unloaded by downstream logic.

The following tables indicate the instructions to be used in programming the microsequencer. The second column of each row provides a mnemonic for the instruction associated with that row. Each instruction is placed in specified bits in the 255 bit instruction word. These bits are indicated in the first column of each row. For example, the instruction for loading the work register pair 2 . . . 3 ("WorkPair2_3"), if it is to be used, is placed in bits 7-13 of the instruction word. The bit locations specified in the third column are offset from the lowest bit specified in the first column. For example, in this same instruction, the source location supplying the data, which would occupy bits 0-5 of the instruction, occupy bits 7-12 of the instruction word.

Work Register Functions
In each of the work register functions, bits [5:0] specify the source location for supplying the data. These are set forth in the Work Register Source Table.

| Bit Positions | Field | Function |
|---|---|---|
| [6:0] | WorkPair0_1 | Loads the Work Register pair 0...1 [6] - Selects which 32-bit register is loaded ("1" = WORK0, "0" = WORK1) |
| [13:7] | WorkPair2_3 | Loads the Work Register pair 2...3 [6] - Selects which 32-bit register is loaded ("1" = WORK2, "0" = WORK3) |
| [20:14] | WorkPair4_5 | Loads the Work Register pair 4...5 [6] - Selects which 32-bit register is loaded ("1" = WORK4, "0" = WORK5) |
| [27:21] | WorkPair6_7 | Loads the Work Register pair 6...7 [6] - Selects which 32-bit register is loaded ("1" = WORK6, "0" = WORK7) |
| [34:28] | WorkPair8_9 | Loads the Work Register pair 8...9 [6] - Selects which 32-bit register is loaded ("1" = WORK8, "0" = WORK9) |
| [41:35] | WorkPair10_11 | Loads the Work Register pair 10...11 [6] - Selects which 32-bit register is loaded ("1" = WORK10, "0" = WORK11) |
| [48:42] | WorkPair12_13 | Loads the Work Register pair 12...13 [6] - Selects which 32-bit register is loaded ("1" = WORK12, "0" = WORK13) |
| [55:49] | WorkPair14_15 | Loads the Work Register pair 14...15 [6] - Selects which 32-bit register is loaded ("1" = WORK14, "0" = WORK15) |

Function Input Registers
In each of the following cases, bits [4:0] are defined in the function input table below.

-continued

| Bit Positions | Field | Function |
|---|---|---|
| [60:56] | ComboA_0 | Loads the Combinatorial A Register 0 (COMBOA_0). |
| [65:61] | ComboA_1 | Loads the Combinatorial A Register 1 (COMBOA_1). |
| [70:66] | ComboB_0 | Loads the Combinatorial B Register 0 (COMBOB_0). |
| [75:71] | ComboB_1 | Loads the Combinatorial B Register 1 (COMBOB_1). |
| [80:76] | Adder0 | Loads the Adder 0 Register (ADD0). |
| [85:81] | Adder1 | Loads the Adder 1 Register (ADD1). |
| [90:86] | CRC_in_lo | Loads the low order CRC input Register (CRC_IN_LO). |
| [95:91] | CRC_in_hi | Loads the high order CRC input Register (CRC_IN_HI). |
| [100:96] | Trans_in | Loads the Translation Table Input Register (TRANS_IN). |
| [105:101] | Inc_Dec_A_in | Loads the Incrementer/Decrementer A Input Register (ID_A_IN). |
| [110:106] | Inc_Dec_B_in | Loads the Incrementer/Decrementer Table B Input Register (ID_B_IN). |

Function Controls

| Bit Positions | Field | Function |
|---|---|---|
| [118:111] | Combinatorial Control A | Executes the operation specified in Combinatorial Block A. Bits [7:0] of the field are defined as in the Combinatorial Execution Table below. |
| [126:119] | Combinatorial Control B | Executes the operation specified in Combinatorial Block B. Bits [7:0] of the field are defined as in the Combinatorial Execution Table below. |
| [130:127] | Adder Control | Executes the operation specified. Bit field is defined below:<br>[1:0] - Operation Requested.<br>  00 - No operation. Do not change Adder Result (ADDER_R).<br>  01 - Simple addition.<br>  10 - Execute (ADDER0 - ADDER1) using two's complement.<br>  11 - Execute (ADDER1 - ADDER0) using two's complement.<br>[3:2] - Loopback requested.<br>  00 - No loopback requested.<br>  01 - Replace ADDER0 with ADDER_R.<br>  10 - Replace ADDER0 with COMBOA_R.<br>  11 - Replace ADDER0 with TRANS_R. |
| [134:131] | Checksum Execution | Adds to the running CRC and Checksum calculations.<br>Bit field is defined as follows:<br>[0] - Load CRC_IN_HI/LO into the checksum calculation.<br>[1] - Load CRC_IN_HI/LO into the CRC-32 calculation.<br>[2] - Load CRC_IN_HI/LO into the CRC32C (masked) calculation.<br>[3] - Loads the CRC test register from CRC_IN_LO (bits [2:0] above should not be active). |
| [144:135] | Translation Execution | Executes the translation function. Bit field is defined as follows:<br>[0] - If set to "1", execute the translation, otherwise hold the output register.<br>[1] - Table select. If set to "1" use the high dual-word of the memory array for the translation tables. Otherwise use the low dual-word for the translation tables.<br>[3:2] - Input register barrel shift. Executes a byte oriented right shift on the data from TRANS_IN before using the |

| | | |
|---|---|---|
| | | data to address the memory array. The value "00" indicates no shift; the value "01" indicates a shift of one byte; etc.<br>[5:4] - Output register barrel shift. Executes a byte oriented right shift on the 32-bit data from the memory array.<br>[9:6] - Final output byte lane mask. Mask corresponds to byte lanes3 through lane0 respectively. A value of "1" indicates no masking of the byte lane. |
| [148:145] | Increment/<br>Decrement<br>Function A | Increments a given value. Bit field is defined as follows:<br>[1:0] - Execution requested.<br>  00 - No execution. Do not change output register.<br>  01 - Increment/Decrement input by 1.<br>  10 - Increment/Decrement input by 2.<br>  11 - Increment/Decrement input by 4.<br>[2] - Inc/Dec Select. If set, the operation this cycle is an increment. Otherwise, the operation is a decrement.<br>[3] - Loopback: If set, adjust the value in the Inc_Dec Result Register (ID_A_R); else use the Inc_Dec Input Register (ID_A_IN) as the logic input. |
| [152:149] | Increment/<br>Decrement<br>Function B | Decrements a given value. Bit field is defined as follows:<br>[1:0] - Execution requested.<br>  00 - No execution. Do not change output register.<br>  01 - Increment/Decrement input by 1.<br>  10 - Increment/Decrement input by 2.<br>  11 - Increment/Decrement input by 4.<br>[2] - Inc/Dec Select. If set, the operation this cycle is an increment. Otherwise, the operation is a decrement.<br>[3] - Loopback: If set, decrement the value in the Inc_Dec Result Register (ID_B_R); else use the Inc_Dec Input Register (ID_B_IN) as the logic input. |
| [163:153] | Output Port0 | Moves the specified 32-bit data fields to the indicated Output Destination. Bit field is defined as follows:<br>[4:0] - Source port field. See Function Input table below. Note that if set to 0h, this port is not in use this instruction cycle.<br>[10:5] - Destination port field. See Output Port Destination table below. |
| [174:164] | Output Port1 | Moves the specified 32-bit data fields to the indicated Output Destination. Bit field is defined as follows:<br>[4:0] - Source port field. See Function Input table below. Note that if set to 0h, this port is not in use this instruction cycle.<br>[10:5] - Destination port field. See Output Port Destination table below. |
| [180:175] | Jump A | Indicates a possible change in program execution. See the Jump Table for field definitions. This field is the primary Jump field. All Jump Table definitions apply here. |
| [186:181] | Jump B | Indicates a possible change in program execution. See the Jump Table for field definitions. This field is a secondary Jump field. Only branch jumps from the Jump Table apply here. All Immediate jumps are defined as Reserved values (in which case this field has no effect). |
| [187] | Jump Combo | Specifies how the Jump A and Jump B fields are linked in the event that Jump B has a valid Branch code and none of the Execute Conditional bits are set. If set to "1", a branch jump occurs if both the conditions represented by Jump A and Jump B are true. If set to "0" a branch jump occurs if either the conditions represented by Jump A and Jump B are true. |
| [192:188] | Execute Conditional | If any bit is non-zero, indicates that the Jump B field is not to be evaluated for a branch jump, but that a single sub-block of the ALU (specified by the mapping below) is to be allowed to execute. If a bit is set to zero, the operation of the indicated block is not affected. If set to one, the execution will be dependent on the flag indicated by Jump B evaluating true.<br>[0] - Operation of Combinatorial Sub-block A dependent on Jump B evaluation.<br>[1] - Operation of Combinatorial Sub-block B dependent on Jump B evaluation.<br>[2] - Operation of Adder Sub-block dependent on Jump B evaluation.<br>[3] - Operation of Incrementer/Decrementer Sub-block A dependent on Jump B evaluation.<br>[4] - Operation of Incrementer/Decrementer Sub-block B dependent on Jump B evaluation. |
| [197:193] | External Control | Activates external logic through the use of a set of one-shot logic. |
| [198] | Reserved | Reserved. |
| [233:199] | Immediate Field | Used to insert raw program data into the logic.<br>[34] - Use 32-bit standard format ("1") versus 16-bit base interpretation ("0").<br>[33] - Lane control for IMMEDIATE1 (valid only if field bit[34] = "0").<br>[32] - Lane control for IMMEDIATE0 (valid only if field bit[34] = "0").<br>[31:16] - Either bits [31:16] for a standard format or the base for IMMEDIATE1 depending on the settings for field bit[34].<br>[15:0] - Either bits [15:0] for a standard format or the base for IMMEDIATE0 depending on the settings for field bit[34]. |
| [245:234] | Target Field | Absolute Sequencer Address referenced as a destination by the Jump fields. |
| [246] | Reserved | Spares. Set to "0". |
| [247] | Interrupt Enable | Indicates whether the external interrupt lines may be acknowledged this instruction cycle. |
| [255:248] | Parity bits | Parity bits for the memory. The parity is set assuming even parity. Each bit covers the following range:<br>[0] - Even parity for instruction bits [31:0].<br>[1] - Even parity for instruction bits [63:32].<br>[2] - Even parity for instructions bits [95:64].<br>[3] - Even parity for instructions bits [127:96].<br>[4] - Even parity for instruction bits [159:128].<br>[5] - Even parity for instruction bits [191:160].<br>[6] - Even parity for instructions bits [223:192].<br>[7] - Even parity for instructions bits [247:224]. |

Work Register Source Table

| Selection Constant | Source | Selection Constant | Source |
|---|---|---|---|
| 000000 | None - don't change the register. | 010000 | CONSTANT0 |
| 000001 | IMMEDIATE Register 0 | 010001 | CONSTANT1 |
| 000010 | IMMEDIATE Register 1 | 010010 | CONSTANT2 |
| 000011 | Input FIFO Port 0 (IN_PORT0) | 010011 | CONSTANT3 |
| 000100 | Input FIFO Port 1 (IN_PORT1) | 010100 | CONSTANT4 |
| 000101 | WORK0. | 010101 | CONSTANT5 |
| 000110 | WORK1. | 010110 | CONSTANT6 |
| 000111 | COMBOA_R | 010111 | CONSTANT7 |
| 001000 | COMBOB_R | 011000 | CONSTANT8 |
| 001001 | ADDER_R | 011001 | CONSTANT9 |
| 001010 | ID_A_R | 011010 | CONSTANT10 |
| 001011 | ID_B_R | 011011 | CONSTANT11 |
| 001100 | TRANS_R | 011100 | CONSTANT12 |
| 001101 | CHECK_R | 011101 | CONSTANT13 |
| 001110 | CRC32_R | 011110 | CONSTANT14 |
| 001111 | CRCM_R | 011111 | CONSTANT15 |

| Selection Constant | Source | Selection Constant | Source |
|---|---|---|---|
| 100000 | SDB/IOD Register 0 (DB_REG0) | 110000 | SDB/IOD Register 16 (DB_REG16) |
| 100001 | SDB/IOD Register 1 (DB_REG1) | 110001 | SDB/IOD Register 17 (DB_REG17) |
| 100010 | SDB/IOD Register 2 (DB_REG2) | 110010 | SDB/IOD Register 18 (DB_REG18) |
| 100011 | SDB/IOD Register 3 (DB_REG3) | 110011 | SDB/IOD Register 19 (DB_REG19) |
| 100100 | SDB/IOD Register 4 (DB_REG4) | 110100 | SDB/IOD Register 20 (DB_REG20) |
| 100101 | SDB/IOD Register 5 (DB_REG5) | 110101 | SDB/IOD Register 21 (DB_REG21) |
| 100110 | SDB/IOD Register 6 (DB_REG6) | 110110 | SDB/IOD Register 22 (DB_REG22) |
| 100111 | SDB/IOD Register 7 (DB_REG7) | 110111 | SDB/IOD Register 23 (DB_REG23) |
| 101000 | SDB/IOD Register 8 (DB_REG8) | 111000 | SDB/IOD Register 24 (DB_REG24) |
| 101001 | SDB/IOD Register 9 (DB_REG9) | 111001 | SDB/IOD Register 25 (DB_REG25) |
| 101010 | SDB/IOD Register 10 (DB_REG10) | 111010 | SDB/IOD Register 26 (DB_REG26) |
| 101011 | SDB/IOD Register 11 (DB_REG11) | 111011 | SDB/IOD Register 27 (DB_REG27) |
| 101100 | SDB/IOD Register 12 (DB_REG12) | 111100 | SDB/IOD Register 28 (DB_REG28) |
| 101101 | SDB/IOD Register 13 (DB_REG13) | 111101 | SDB/IOD Register 29 (DB_REG29) |
| 101110 | SDB/IOD Register 14 (DB_REG12) | 111110 | External Controller Read Port0 (EC_R0) |
| 101111 | SDB/IOD Register 15 (DB_REG13) | 111111 | External Controller Read Port1 (EC_R1) |

Function Input Source Table

| Selection Constant | Source | Selection Constant | Source |
|---|---|---|---|
| 00000 | None - don't change the register. | 10000 | WORK0 |
| 00001 | IMMEDIATE0 Register | 10001 | WORK1 |
| 00010 | IMMEDIATE1 Register | 10010 | WORK2 |
| 00011 | Reserved. | 10011 | WORK3 |
| 00100 | Input FIFO Port 0 (IN_PORT0) | 10100 | WORK4 |
| 00101 | Input FIFO Port1 (IN_PORT1) | 10101 | WORK5 |
| 00110 | Reserved. | 10110 | WORK6 |
| 00111 | COMBOA_R | 10111 | WORK7 |
| 01000 | COMBOB_R | 11000 | WORK8 |
| 01001 | ADDER_R | 11001 | WORK9 |
| 01010 | ID_A_R | 11010 | WORK10 |
| 01011 | ID_B_R | 11011 | WORK11 |
| 01100 | TRANS_R | 11100 | WORK12 |
| 01101 | CHECK_R | 11101 | WORK13 |
| 01110 | CRC32_R | 11110 | WORK14 |
| 01111 | CRCM_R | 11111 | WORK15 |

Output Port Destination Values

| Selection Constant | Source | Selection Constant | Source |
|---|---|---|---|
| 000000 | SDB/IOD Register 0 (DB_REG0) | 011011 | SDB/IOD Register 27 (DB_REG27) |
| 000001 | SDB/IOD Register 1 (DB_REG1) | 011100 | SDB/IOD Register 28 (DB_REG28) |
| 000010 | SDB/IOD Register 2 (DB_REG2) | 011101 | SDB/IOD Register 29 (DB_REG29) |
| 000011 | SDB/IOD Register 3 (DB_REG3) | 011110 | Output FIFO Port A (HI) |
| 000100 | SDB/IOD Register 4 (DB_REG4) | 011111 | Output FIFO Port B (LO) |
| 000101 | SDB/IOD Register 5 (DB_REG5) | 100000 | Output Register 0 (OUT_REG0) |
| 000110 | SDB/IOD Register 6 (DB_REG6) | 100001 | Output Register 1 (OUT_REG1) |
| 000111 | SDB/IOD Register 7 (DB_REG7) | 100010 | Output Register 2 (OUT_REG2) |
| 001000 | SDB/IOD Register 8 (DB_REG8) | 100011 | Output Register 3 (OUT_REG3) |
| 001001 | SDB/IOD Register 9 (DB_REG9) | 100100 | Output Register 4 (OUT_REG4) |
| 001010 | SDB/IOD Register 10 (DB_REG10) | 100101 | Output Register 5 (OUT_REG5) |
| 001011 | SDB/IOD Register 11 (DB_REG11) | 100110 | Output Register 6 (OUT_REG6) |
| 001100 | SDB/IOD Register 12 (DB_REG12) | 100111 | Output Register 7 (OUT_REG7) |
| 001101 | SDB/IOD Register 13 (DB_REG13) | 101000 | Output Register 8 (OUT_REG8) |
| 001110 | SDB/IOD Register 14 (DB_REG14) | 101001 | Output Register 9 (OUT_REG9) |
| 001111 | SDB/IOD Register 15 (DB_REG15) | 101010 | Output Register 10 (OUT_REG10) |
| 010000 | SDB/IOD Register 16 (DB_REG16) | 101011 | Output Register 11 (OUT_REG11) |
| 010001 | SDB/IOD Register 17 (DB_REG17) | 101100 | Output Register 12 (OUT_REG12) |
| 010010 | SDB/IOD Register 18 (DB_REG18) | 101101 | Output Register 13 (OUT_REG13) |
| 010011 | SDB/IOD Register 19 (DB_REG19) | 101110 | Output Register 14 (OUT_REG14) |
| 010100 | SDB/IOD Register 20 (DB_REG20) | 101111 | Output Register 15 (OUT_REG15) |
| 010101 | SDB/IOD Register 21 (DB_REG21) | 110000 | Load CRC32 Hold Register. |
| 010110 | SDB/IOD Register 22 (DB_REG22) | 110001 | Load CRCP Hold Register. |
| 010111 | SDB/IOD Register 23 (DB_REG23) | 110010 | Load Checksum S1 Hold Register (basic checksum register). |
| 011000 | SDB/IOD Register 24 (DB_REG24) | 110011 | Load Checksum S2 Hold Register (running sum of the checksum register |

Output Port Destination Values

| Selection Constant | Source | Selection Constant | |
|---|---|---|---|
| 011001 | SDB/IOD Register 25 (DB_REG25) | 110100–111111 | S1). Reserved codes. |
| 011010 | SDB/IOD Register 26 (DB_REG26) | | |

Combinatorial Execution Table

| Field Position | Value | |
|---|---|---|
| [3:0] | | Operation Executed. |
| | 0000 | No operation. Do not alter output register. |
| | 0001 | Two operand OR. |
| | 0010 | Two operand AND. |
| | 0011 | Two operand XOR. |
| | 0100 | Single operand NOT. |
| | 0101 | Single operand 16-bit barrel shifter. |
| | 0110 | Single operand 8-bit left barrel shifter. |
| | 0111 | Single operand 8-bit right barrel shifter. |
| | 1000 | Single operand 4-bit left barrel shifter. |
| | 1001 | Single operand 4-bit right barrel shifter. |
| | 1010 | Single operand 2-bit left barrel shifter. |
| | 1011 | Single operand 2-bit right barrel shifter. |
| | 1100 | Single operand 1-bit left barrel shifter. |
| | 1101 | Single operand 1-bit right barrel shifter. |
| | 1110 | Set output register to Combo0 register. |
| | 1111 | Set output to 0000_0000h. |
| [6:4] | | Combinatorial Input 0 Loopback. These bits allow us to substitute the value in Combo0 with a value in one of the registers below. The goal is to limit the pipeline delays created by having to re-write the Combo0 register. |
| | 000 | Use COMBO0. |
| | 001 | Use COMBOA_R. |
| | 010 | Use COMBOB_R. |
| | 011 | Use ADDER_R. |
| | 100 | Use TRANS_R. |
| | 101 | Use ID_A_R. |
| | 110 | Use ID_B_R. |
| | 111 | Use CHECK_R. |
| [7] | | Combinatorial Input 1 (COMBO1) Loopback/Mask. If invoked, this bit will either substitute the Combinatorial Result for Combinatorial Input 1 (if executing the AND/OR/XOR functions) or use the value in Combinatorial Input 1 as a mask for a barrel shift operation (the mask is applied after the barrel shift). |
| | 0 | No Change to COMBO1 operation. |
| | 1 | Either use COMBO_R in place of COMBO1 or use COMBO1 as a mask for the barrel shifter. |

Jump Instruction Table

| Jump Code | Jump Type | Definition |
|---|---|---|
| 000000 | Immediate | Execute the next sequential (x+1) instruction cycle. |
| 000001 | Branch | If COMBOA_R equals zero, branch to value in TARGET register. |
| 000010 | Branch | If COMBOA_R does not equal zero, branch to value in TARGET register. |
| 000011 | Branch | If COMBOB_R equals zero, branch to value in TARGET register. |
| 000100 | Branch | If COMBOB_R does not equal zero, branch to value in TARGET register. |
| 000101 | Branch | If last ADDER_R equals zero, branch to value in TARGET register. |
| 000110 | Branch | If last ADDER_R does not equal zero, branch to value in TARGET register. |
| 000111 | Branch | If last Adder operation produced a carry, branch to value in TARGET register. |
| 001000 | Branch | If last Adder operation did not produce a carry, branch to value in TARGET register. |
| 001001 | Branch | If last Incrementer operation using INC_DEC_A produced a carry, branch to value in TARGET register. |
| 001010 | Branch | If last Incrementer operation using INC_DEC_A did not produce a carry, branch to value in TARGET register. |
| 001011 | Branch | If last Decrementer operation using INC_DEC_A produced a borrow OR equals zero, branch to value in TARGET register. |
| 001100 | Branch | If last Decrementer operation using INC_DEC_A did not produce a borrow AND does not equal zero, branch to value in TARGET register. |
| 001101 | Branch | If last Incrementer operation using INC_DEC_B produced a carry, branch to value in TARGET register. |
| 001110 | Branch | If last Incrementer operation using INC_DEC_B did not produce a carry, branch to value in TARGET register. |
| 001111 | Branch | If last Decrementer operation using INC_DEC_B produced a borrow OR equals zero, branch to value in TARGET register. |
| 010000 | Branch | If last Decrementer operation using INC_DEC_B did not produce a borrow AND does not equal zero, branch to value in TARGET register. |
| 010001 | Branch | If last TRANS_R equals zero, branch to value in TARGET register. |
| 010010 | Branch | If last TRANS_R does not equal zero, branch to value in TARGET register. |
| 010011 | Branch | If CHECK_R equals Checksum Test register, branch to value in TARGET register. |
| 010100 | Branch | If CHECK_R does not equal Checksum Test register, branch to value in TARGET register. |
| 010101 | Branch | If CRC32_R equals 0x0000, branch to value in TARGET register. |
| 010110 | Branch | If CRC32_R does not equal 0x0000, branch to value in TARGET register. |
| 010111 | Branch | If CRCP_R equals 0x0000, branch to value in TARGET register. |
| 011000 | Branch | If CRCP_R does not equal 0x0000, branch to value in TARGET register. |
| 011001 | Branch | If Input Test Flag 1 is set, branch to value in TARGET register. |
| 011010 | Branch | If Input Test Flag 2 is set, branch to value in TARGET register. |
| 011011 | Branch | If Input Test Flag 3 is set, branch to value in TARGET register. |
| 011100 | Branch | If Input Test Flag 4 is set, branch to value in TARGET register. |
| 011101 | Immediate | CASE_WORK15: Next address is a case jump based on the lowest 6-bits of the WORK15 added to the next sequential address (x + 1 + case). |
| 011110 | Immediate | CASE_TRANS: Next address is a case jump based on the lowest 6-bits of the TRANS_R added to the next sequential address (x + 1 + case). |
| 011111 | Immediate | JUMP_TARGET: Next address is the address in the TARGET register. |
| 100000 | Branch | If WORK4 is greater than WORK6, branch to value in TARGET register. |
| 100001 | Branch | If WORK4 is not greater than WORK6, branch to value in TARGET register. |
| 100010 | Branch | If WORK4 is less than WORK6, branch to value in TARGET register. |
| 100011 | Branch | If WORK4 is not less than WORK6, branch to value in TARGET register. |
| 100100 | Branch | If WORK4 is equal to WORK6, branch to value in TARGET register. |

-continued

Jump Instruction Table

| Jump Code | Jump Type | Definition |
|---|---|---|
| 100101 | Branch | If WORK4 is not equal to WORK6, branch to value in TARGET register. |
| 100110 | Branch | Will depend on the mode registers attached to the automatic comparators:<br>If set for Natural Arithmetic mode, if (WORK4 AND WORK6) is non-zero, branch to value in TARGET register.<br>If set for any Serial Arithmetic mode, if the relationship between WORK4 and WORK6 cannot be evaluated, branch to value in TARGET register. |
| 100111 | Branch | Will depend on the mode registers attached to the automatic comparators:<br>If set for Natural Arithmetic mode, if (WORK4 AND WORK6) is zero, branch to value in TARGET register.<br>If set for any Serial Arithmetic mode, if the relationship between WORK4 and WORK6 can be evaluated, branch to value in TARGET register. |
| 101000 | Branch | If WORK5 is greater than WORK7, branch to value in TARGET register. |
| 101001 | Branch | If WORK5 is not greater than WORK7, branch to value in TARGET register. |
| 101010 | Branch | If WORK5 is less than WORK7, branch to value in TARGET register. |
| 101011 | Branch | If WORK5 is not less than WORK7, branch to value in TARGET register. |
| 101100 | Branch | If WORK5 is equal to WORK7, branch to value in TARGET register. |
| 101101 | Branch | If WORK5 is not equal to WORK7, branch to value in TARGET register. |
| 101110 | Branch | Will depend on the mode registers attached to the automatic comparators:<br>If set for Natural Arithmetic mode, if (WORK5 AND WORK7) is non-zero, branch to value in TARGET register.<br>If set for any Serial Arithmetic mode, if the relationship between WORK5 and WORK7 cannot be evaluated, branch to value in TARGET register. |
| 101111 | Branch | Will depend on the mode registers attached to the automatic comparators:<br>If set for Natural Arithmetic mode, if (WORK5 AND WORK7) is zero, branch to value in TARGET register.<br>If set for any Serial Arithmetic mode, if the relationship between WORK5 and WORK7 can be evaluated, branch to value in TARGET register. |
| 110000 | Branch | If WORK8 is greater than WORK10, branch to value in TARGET register. |
| 110001 | Branch | If WORK8 is not greater than WORK10, branch to value in TARGET register. |
| 110010 | Branch | If WORK8 is less than WORK10, branch to value in TARGET register. |
| 110011 | Branch | If WORK8 is not less than WORK10, branch to value in TARGET register. |
| 110100 | Branch | If WORK8 is equal to WORK10, branch to value in TARGET register. |
| 110101 | Branch | If WORK8 is not equal to WORK10, branch to value in TARGET register. |
| 110110 | Branch | Will depend on the mode registers attached to the automatic comparators:<br>If set for Natural Arithmetic mode, if (WORK8 AND WORK10) is non-zero, branch to value in TARGET register.<br>If set for any Serial Arithmetic mode, if the relationship between WORK8 and WORK10 cannot be evaluated, branch to value in TARGET register. |
| 110111 | Branch | Will depend on the mode registers attached to the automatic comparators:<br>If set for Natural Arithmetic mode, if (WORK8 AND WORK10) is zero, branch to value in TARGET register.<br>If set for any Serial Arithmetic mode, if the relationship between WORK8 and WORK10 can be evaluated, branch to value in TARGET register. |
| 111000 | Branch | If WORK9 is greater than WORK11, branch to value in TARGET register. |
| 111001 | Branch | If WORK9 is not greater than WORK11, branch to value in TARGET register. |
| 111010 | Branch | If WORK9 is less than WORK11, branch to value in TARGET register. |
| 111011 | Branch | If WORK9 is not less than WORK11, branch to value in TARGET register. |
| 111100 | Branch | If WORK9 is equal to WORK11, branch to value in TARGET register. |
| 111101 | Branch | If WORK9 is not equal to WORK11, branch to value in TARGET register. |
| 111110 | Branch | Will depend on the mode registers attached to the automatic comparators:<br>If set for Natural Arithmetic mode, if (WORK9 AND WORK11) is non-zero, branch to value in TARGET register.<br>If set for any Serial Arithmetic mode, if the relationship between WORK9 and WORK11 cannot be evaluated, branch to value in TARGET register. |
| 111111 | Branch | Will depend on the mode registers attached to the automatic comparators:<br>If set for Natural Arithmetic mode, if (WORK9 AND WORK11) is zero, branch to value in TARGET register.<br>If set for any Serial Arithmetic mode, if the relationship between WORK9 and WORK11 can be evaluated, branch to value in TARGET register. |

The components of the system 10 shown in FIG. 3 can be integrated into a single integrated circuit or they can be distributed across two or more integrated circuits in communication with each other. The scope of the invention is not governed by the physical configuration of the system elements but is instead circumscribed by the appended claims.

We claim:

1. A system for enabling communication between a first network having a first network protocol and a second network having a second network protocol, the second network being a storage area network, said system comprising:
  a first data port for receiving first input data and first state information from said first network, said first input data being expressed in said first network protocol;
  a second data port for receiving second input data and second state information from said second network, said second input data being expressed in said second network protocol;
  a first microsequencer system configured to translate said second input data into corresponding data expressed in said first network protocol on the basis of said first state information, the first microsequencer system including one or more microsequencers configured to cooperate in translating said second input data into corresponding data expressed in said first network protocol;
  a second microsequencer system configured to translate said first input data into corresponding data expressed in said second network protocol on the basis of said second state information, the second microsequencer system including one or more microsequencers configured to cooperate in translating said first input data into corresponding data expressed in said second network protocol; and an instruction memory accessible to each of the microsequencers of the first and second microsequencer systems, said instruction memory having a plurality of instruction words, each of said instruction words forming a Very Long Instruction Word (VLTW) having a plurality of instruction fields executable in parallel by different functional units of each of the microsequencers to enable the microsequencers to execute a plurality of instructions in a single instruction cycle, the instruction memory being loadable via a processor interface to make the microsequencers programmable to accommodate different first and second network protocols.

2. The system of claim 1, further comprising:
an instruction-memory pointer for identifying a selected instruction word in said instruction memory.

3. The system of claim 1, further comprising a translation-memory accessible to each of the microsequencers of said first and second microsequencer systems, said translation-memory having
a translation-memory address, and
a translation-memory element corresponding to said translation-memory address, said translation-memory element including data for musing an instruction-memory pointer to jump to a selected instruction word.

4. The system of claim 3, wherein said translation-memory element is configured to include an absolute address of said selected instruction word.

5. The system of claim 3, wherein said translation-memory element is configured to include an offset from a current instruction word to said selected instruction word.

6. The system of claim 3, further comprising a translation-memory pointer for indirectly causing said instruction-memoiy pointer to jump to a selected instruction memory address.

7. The system of claim 6, wherein said translation-memory pointer is configured to identify a selected translation-memory address corresponding to a translation memory element that contains data indicative of said selected instruction-memory address.

8. The system of claim 1, further comprising a translation-memory having:
a translation-memory address;
a first translation-memory element corresponding to said translation-memory address, said first translation-memory element including data for causing an instruction-memory pointer to jump to a first instruction word;
a second translation-memory element corresponding to said translation-memory address, said second translation-memory element including data for causing said instruction-memory pointer to jump to a second instruction word; and
a selector for selecting said first translation-memory element.

9. The system of claim 8, whei:ein said selector comprises a multiplexer having
a first multiplexer input for receiving data indicative of content of said first translation-memory element;
a second multiplexer input for receiving data indicative of content of said second translation-memory element;
an output providing data selected from at least said first multiplexer input and said second multiplexer input; and
a control input for controlling data provided at said output.

10. The system of claim 1, further comprising an output port in communication with said second microsequencer system for providing said corresponding data to said second network.

11. The system of claim 1, wherein said first and second data ports and said first and second niicrosequencer systems are integrated into one integrated circuit.

* * * * *